United States Patent
Grasso et al.

(10) Patent No.: US 10,312,821 B2
(45) Date of Patent: Jun. 4, 2019

(54) RECTIFIER CIRCUIT WITH MULTIPLE CELLS, EACH CELL HAVING TRANSISTORS WITH BULKS BIASED BY SIGNALS GENERATED IN OTHER CELLS TO CONTROL THRESHOLD VOLTAGE, AND CORRESPONDING DEVICE AND METHOD

(71) Applicant: STMicroelectronics S.r.l., Agrate Brianza (IT)

(72) Inventors: Leandro Grasso, Sortino (IT); Ranieri Guerra, S. Giovanni la Punta (IT); Giuseppe Palmisano, S. Giovanni la Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 166 days.

(21) Appl. No.: 15/359,213

(22) Filed: Nov. 22, 2016

(65) Prior Publication Data
US 2017/0288568 A1    Oct. 5, 2017

(30) Foreign Application Priority Data
Apr. 5, 2016   (IT) .......................... 102016000034851

(51) Int. Cl.
    *H02M 7/217*         (2006.01)
    *H02M 7/219*         (2006.01)
    (Continued)

(52) U.S. Cl.
    CPC .......... *H02M 7/217* (2013.01); *H02M 7/219* (2013.01); *H02M 3/33592* (2013.01);
    (Continued)

(58) Field of Classification Search
    CPC ..... G05F 3/18; G05F 3/22; G05F 3/30; G05F 3/262; G05F 3/265; H02M 3/33592;
    (Continued)

(56) References Cited

U.S. PATENT DOCUMENTS

2014/0254224 A1*   9/2014   Feldtkeller .......... H02M 7/5387
                                                                    363/127
2015/0333534 A1*   11/2015   Liu ..................... H01L 29/7391
                                                                    307/104

OTHER PUBLICATIONS

Chouhan, Shailesh Singh et al: "A Modified Cross Coupled Rectifier based Charge Pump for Energy Harvesting using RF to DC conversion," IEEE, 2013 (4 pages).
(Continued)

*Primary Examiner* — Jue Zhang
*Assistant Examiner* — Lakaisha Jackson
(74) *Attorney, Agent, or Firm* — Crowe & Dunlevy (57) ABSTRACT

A rectifier cell includes a first cell branch and a second cell branch that extend in parallel between two opposite nodes receiving an a.c. signal. The first cell branch includes a first pair of transistors arranged with their current paths cascaded, with a first intermediate point in-between. The second cell branch includes a second pair of transistors arranged with their current paths cascaded, with a second intermediate point in-between. Each of the pairs of transistors includes a first transistor with a control terminal coupled to one of the two opposite nodes and a second transistor with a control terminal coupled to the other of the two opposite nodes. The bulks of the transistors receive voltages in order to vary the transistor threshold voltage by bringing the threshold voltage to a first value during forward conduction and to a second value during reverse conduction.

16 Claims, 4 Drawing Sheets

(51) Int. Cl.
  *H02M 7/06* (2006.01)
  *H02M 3/335* (2006.01)
  *H02M 7/15* (2006.01)
  *H02M 7/04* (2006.01)

(52) U.S. Cl.
  CPC .............. *H02M 7/046* (2013.01); *H02M 7/06* (2013.01); *H02M 7/15* (2013.01); *H02M 2007/2195* (2013.01)

(58) Field of Classification Search
  CPC .......... H02M 7/06; H02M 7/15; H02M 7/046; H02M 7/217; H02M 7/219; H02M 2007/2195
  See application file for complete search history.

(56) References Cited

OTHER PUBLICATIONS

Christian Peters et al: "A Sub-500 mV Highly Efficient Active Rectifier for Energy Harvesting Applicantions", IEEE Transactions on Circuits and Systems I: Regular Papers, IEEE, US, vol. 58, No. 7, Jul. 1, 2011 (Jul. 1, 2011), pp. 1542-1550.

Hyung-Min Lee et al: "An Integrated Power-Efficient Active Rectifier With Offset-Controlled High Speed Comparators for Inductively Powered Applicantions", IEEE Transactions on Circuits and Systems I: Regular Papers, IEEE, US, vol. 58, No. 8, Aug. 1, 2011 (Aug. 1, 2011), pp. 1749-1760.

IT Search Report and Written Opinion for IT Appl. No. 102016000034851 dated Nov. 9, 2016 (8 pages).

Kamalinejad, Pouya et al: "Efficiency Enhancement Techniques and a Dual-Band Approach in RF Rectifiers for Wireless Power Harvesting," 2014 IEEE, pp. 2049-2052.

Mahsa Ebrahimian et al: Enhanced RF to DC CMOS rectifier with capacitor-bootstrapped transistor, IEEE International Symposium on Circuits and Systems. ISCAS 2010—May 30-Jun. 2, 2010—Paris, France, IEEE, US, May 30, 2010 (May 30, 2010), pp. 1655-1658.

Shin, Johnshin et al: "A New Charge Pump Without Degradation in Threshold Voltage Due to Body Effect," IEEE Journal of Solid-State Circuits, vol. 35, No. 8, Aug. 2000, pp. 1227-1230.

Stephen T Kim et al: "Semi-active high-efficient CMOS rectifier for wireless power transmission", Radio Frequency Integrated Circuits Symposium (RFIC), 2010 IEEE, IEEE, Piscataway, NJ, USA, May 23, 2010 (May 23, 2010), pp. 97-100.

Stoopman Mark et al: "Co-Design of a CMOS Rectifier and Small Loop Antenna for Highly Sensitive RF Energy Harvesters", IEEE Journal of Solid-State Circuits, IEEE Service Center, Piscataway, NJ, USA, vol. 49, No. 3, Mar. 1, 2014 (Mar. 1, 2014), pp. 622-634.

Theilmann, Paul T. et al: "A uW Complementary Bridge Rectifier With Near Zero Turn-on Voltage in SOS CMOS for Wireless Power Supplies," IEEE Transactions on Circuits and Systems, I: Regular Papers, vol. 59, No. 9, Sep. 2012, pp. 2111-2124.

\* cited by examiner

RECTIFIER CIRCUIT WITH MULTIPLE CELLS, EACH CELL HAVING TRANSISTORS WITH BULKS BIASED BY SIGNALS GENERATED IN OTHER CELLS TO CONTROL THRESHOLD VOLTAGE, AND CORRESPONDING DEVICE AND METHOD

PRIORITY CLAIM

This application claims the priority benefit of Italian patent application number 102016000034851, filed on Apr. 5, 2016, the content of which is hereby incorporated by reference in its entirety to the maximum extent allowable by law.

TECHNICAL FIELD

The present description relates to rectifier circuits.

One or more embodiments may find application in harvesting of energy coming from electromagnetic waves in order to supply, for example, a wireless transceiver.

BACKGROUND

Recently, there has been an increasingly widespread use of solutions that envisage the use of components configured so as to limit as much as possible the consumption of energy, supplied, for example, by a battery or even so as to do without use thereof (the so-called "batteryless components"), in order to reduce the production and maintenance costs.

This may, for example, be the case of a sensor network (for instance, of a wireless type), in which each individual node limits consumption of the battery or even does without it.

Notwithstanding the extensive activity of innovation developed in the sector, there is still felt the need to have available solutions that are further improved from various standpoints, for example as regards:
  reducing the losses in efficiency that can be put down to the threshold voltages, with consequent possibility of operating with (very) low input powers;
  reducing the losses in efficiency that can be put down to onset of reverse currents that tend to discharge the output capacitance;
  avoiding the addition of further circuit components, which is likely to render problematical operation with a low level of input power as a result of the losses introduced; and
  avoiding recourse to zero-threshold transistors, a technology that is likely to lead to an increase in costs.

SUMMARY

According to one or more embodiments, a rectifier circuit is provided.

One or more embodiments may also regard a corresponding device, for example a so-called energy harvester, as well as a corresponding method.

One or more embodiments may envisage a compensation of reverse currents such as to improve the efficiency of a harvester deriving from a double-half-wave CMOS rectifier without adding perturbing elements that might introduce losses in the system, enabling the circuit to function with even very low levels of input power.

BRIEF DESCRIPTION OF THE DRAWINGS

One or more embodiments will now be described, purely by way of non-limiting example, with reference to the annexed drawings, wherein.

DETAILED DESCRIPTION OF THE DRAWINGS

In the ensuing description, various specific details are illustrated, aimed at providing an in-depth understanding of various examples of embodiments of the present description. The embodiments may be obtained without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Consequently, phrases such as "in an embodiment" or "in one embodiment" that may appear in various points of the present description do not necessarily refer exactly to one and the same embodiment. Furthermore, particular conformations, structures, or characteristics may be combined in any adequate way in one or more embodiments.

The references used herein are provided simply for convenience and hence do not define the sphere of protection or the scope of the embodiments.

Figure 1:
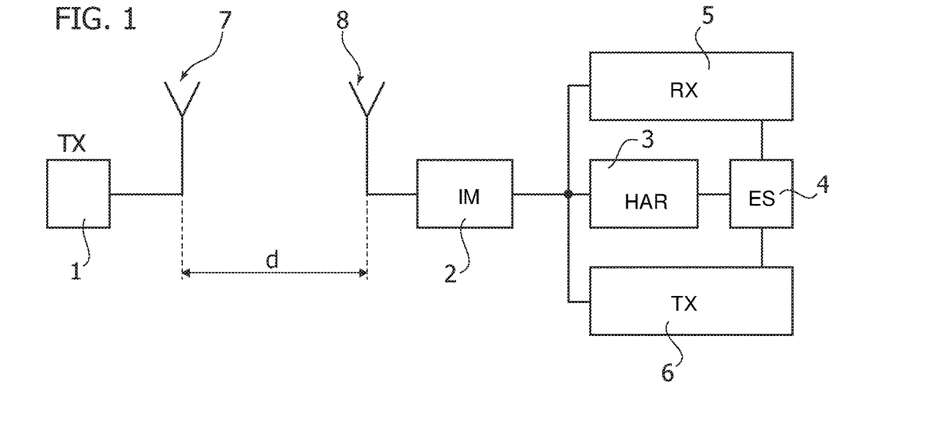
FIG. 1 represents a functional block diagram of a transceiver system.

FIG. 1 illustrates a functional block diagram of a transceiver system. Such a system can be used, for example within a wireless sensor network, in which each individual node limits battery consumption or even does without its use (batteryless mode), so as to reduce the production and maintenance costs.

FIG. 1 shows, by way of example, a block diagram in which a transmitter (TX) block 1 in transmitting mode (on the left in the figure) produces an electrical signal such as to give rise to an electromagnetic wave irradiated by a transmitting antenna 7.

Once a distance d has been covered, this wave impinges upon a receiving antenna 8, which re-transforms it into an electrical signal. The block 2 provides the impedance matching (IM) between the antenna and the subsequent blocks (blocks 3, 5, and 6) and can be englobed in the receiving antenna 8, which is purposely designed.

The receiver (RX) 5, and a possible transmitter (TX) 6 provided for transmission in the opposite direction, are supplied with the electrical energy stored in an energy storage (ES) 4. The ES block 4 may comprise, for example, a rechargeable battery or a capacitance (capacitor or supercapacitor). The latter block may in turn be supplied by a circuit 3, the so-called harvester (HAR), which is able to obtain from the electrical signal received from the antenna 8 a d.c. signal that can be used for charging the block 4 so as to obtain the energy necessary for operation of the entire circuitry.

The role that this circuit performs in the system can be described and quantified with the Friis transmission equation, which, appropriately re-elaborated, supplies the power stored in the ES block 4 at output from the harvester HAR:

$$P_{stor} = \eta(1 - |S_{11}|^2) P_t G_t G_r \left(\frac{\lambda}{4\pi}\right)^2 \frac{1}{d^n} \quad (1)$$

where: $\eta$ is the efficiency of the harvester understood as ratio between the d.c. stored power $P_{stor}$ and the a.c. power at output from the impedance matching block 2; $S_{11}$ is the reflection coefficient seen by the antenna 8; $P_t$ is the power transmitted by the antenna 7; and $G_t$ and $G_r$ are the gain of the antenna 7 and the gain of the antenna 8, respectively.

The exponent n applied to the distance d between the nodes can range from 1.6 to 3.3 according to the environment in which the system is operating (for example, n=2 in the case of free space).

The wavelength $\lambda$ may be determined from the context of application, with the power transmitted linked to current standards, and the gains of the antennas that may depend mainly upon the overall dimensions and upon the coverage constraints.

Assuming, as is reasonable to do, that the circuit is well matched to the antenna, the improvement in the efficiency $\eta$ in principle enables an increase in the distance d between the nodes.

This condition, considering that the d.c. stored power $P_{stor}$ is a specification fixed by the context of application, may mean that the harvester 3 is able to work with a lower incident power, i.e., that the circuit exhibits a higher sensitivity.

From the standpoint of implementation, circuits of the type considered herein may be implemented starting from two main topologies.

Figure 2:
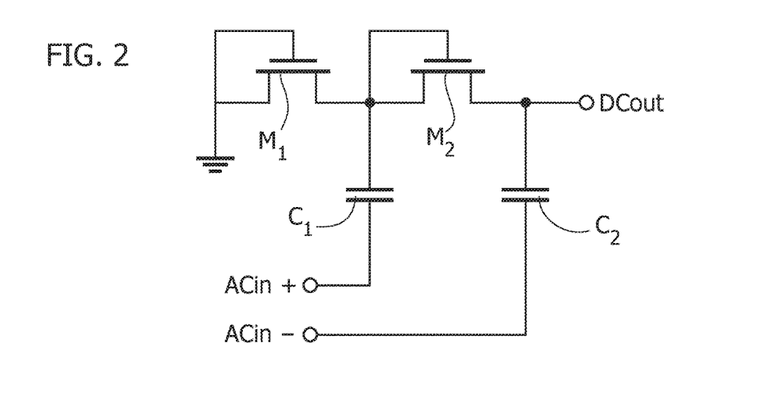
FIG. 2 exemplifies a basic circuit diagram of a charge pump.

The first is a charge pump according to the Dickson scheme, the single-stage version of which is illustrated in FIG. 2. Here two transistors (for example, MOSFETs) $M_1$, $M_2$ are set with their (source-to-drain) current paths cascaded between a ground terminal and a d.c. output terminal DCout with an a.c. differential supply ACin+, ACin− applied via two capacitors $C_1$ and $C_2$ to the intermediate point between the transistors $M_1$, $M_2$ and to the d.c. output terminal DCout.

By applying a sinusoidal signal $v_{in}=V_{in} \sin(\omega t)$ to the terminals ACin+ and ACin−, the circuit in question can supply a rectified waveform at the output terminal DCout. In fact, during the negative half-wave, the transistor $M_1$ is on, whereas the transistor $M_2$ is off, so that the capacitance $C_1$ is charged with a voltage level equal to the amplitude of the input signal $V_{in}$ minus the threshold voltage $v_{th}$ of the transistor $M_1$. During the positive half-wave, the transistor $M_1$ is off, and the transistor $M_2$ is on, so that there is a passage of charge from the capacitance $C_1$ to the capacitance $C_2$. Assuming, as is reasonable to do, that the two transistors are the same and have practically the same threshold voltage, the level of output voltage DCout, but for the capacitive voltage divisions present in the network, hence settles at a d.c. value:

$$V_{DCout} = 2(V_{in} - V_{th}) \quad (2)$$

The loss in efficiency due to the threshold voltages renders this topology far from suited to working with very low input powers, even in the presence of compensation techniques designed to improve the overall efficiency thereof.

Figure 3:
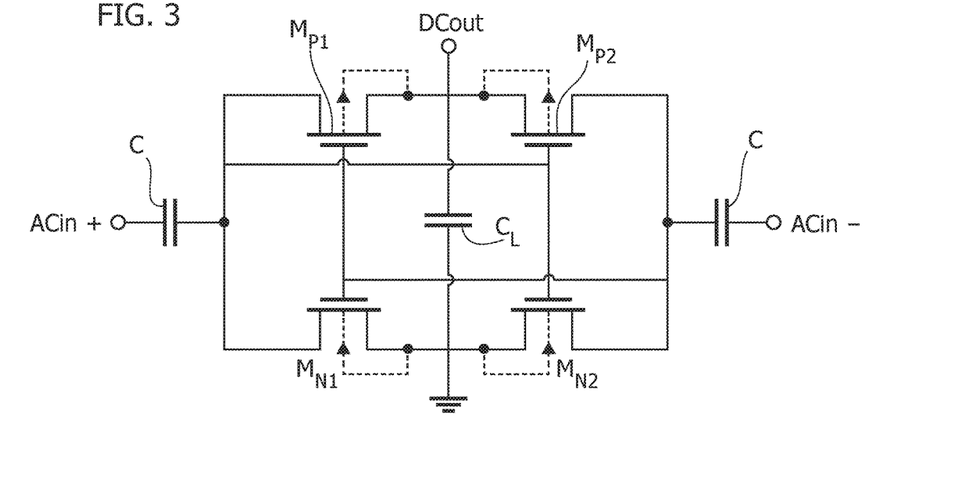
FIG. 3 exemplifies a circuit diagram of a rectifier circuit.

A second topology to which reference may be made is the one deriving from a double-half-wave rectifier in which the transistors, instead of being diode-connected, are connected as exemplified in FIG. 3 (according to a diagram that may be defined as "gate-coupled rectifier circuit") in such a way as to compensate for the losses due to the threshold voltages.

In this case, an a.c. differential supply ACin+, ACin− is applied via two capacitors C (which may be present only in the multi-stage version that will be illustrated hereinafter) at the opposite terminals of a cell comprising two branches in parallel, with:

the first branch comprising a pair of pMOS transistors, $M_{P1}$ and $M_{P2}$, arranged with their current paths (source-to-drain or drain-to-source) cascaded;

the second branch comprising a pair of nMOS transistors, $M_{N1}$ and $M_{N2}$, which are likewise arranged with their current paths cascaded;

the gates of the transistors $M_{P2}$ and of $M_{N2}$ coupled to the terminal of the cell applied (via the first capacitor C) to which is the signal ACin+;

the gate of the transistors $M_{P1}$ and of $M_{N1}$ coupled to the terminal of the cell applied (via the second capacitor C) to which is the signal ACin−; and a charge capacitor $C_L$ set between the intermediate points of the two pairs of transistors ($M_{P1}$, $M_{P2}$ and $M_{N1}$, $M_{N2}$, respectively) with its terminals connected to ground and to the d.c. output terminal DCout, respectively.

In the diagram of FIG. 3, during the positive half-wave of the input signal, the pMOS transistor $M_{P1}$ and the nMOS transistor $M_{N2}$ are on, whereas the pMOS transistor $M_{P2}$ and the nMOS transistor $M_{N1}$ are off, so that the current flows through the charge capacitor $C_L$ set between the terminal DCout and ground.

During the negative half-wave, the transistors $M_{P2}$ and $M_{N1}$ are on, whereas the transistors $M_{P1}$ and $M_{N2}$ are off, but the current still flows in the same direction. This leads to an accumulation of charge in the output capacitance $C_L$, thus generating a d.c. voltage.

In this case, the voltage drops between the input and the output are mainly due to the resistances present on the transistors in conduction (on-resistances), so that the voltage losses are one order of magnitude lower than in the case of the basic Dickson topology of FIG. 2.

Figure 4:
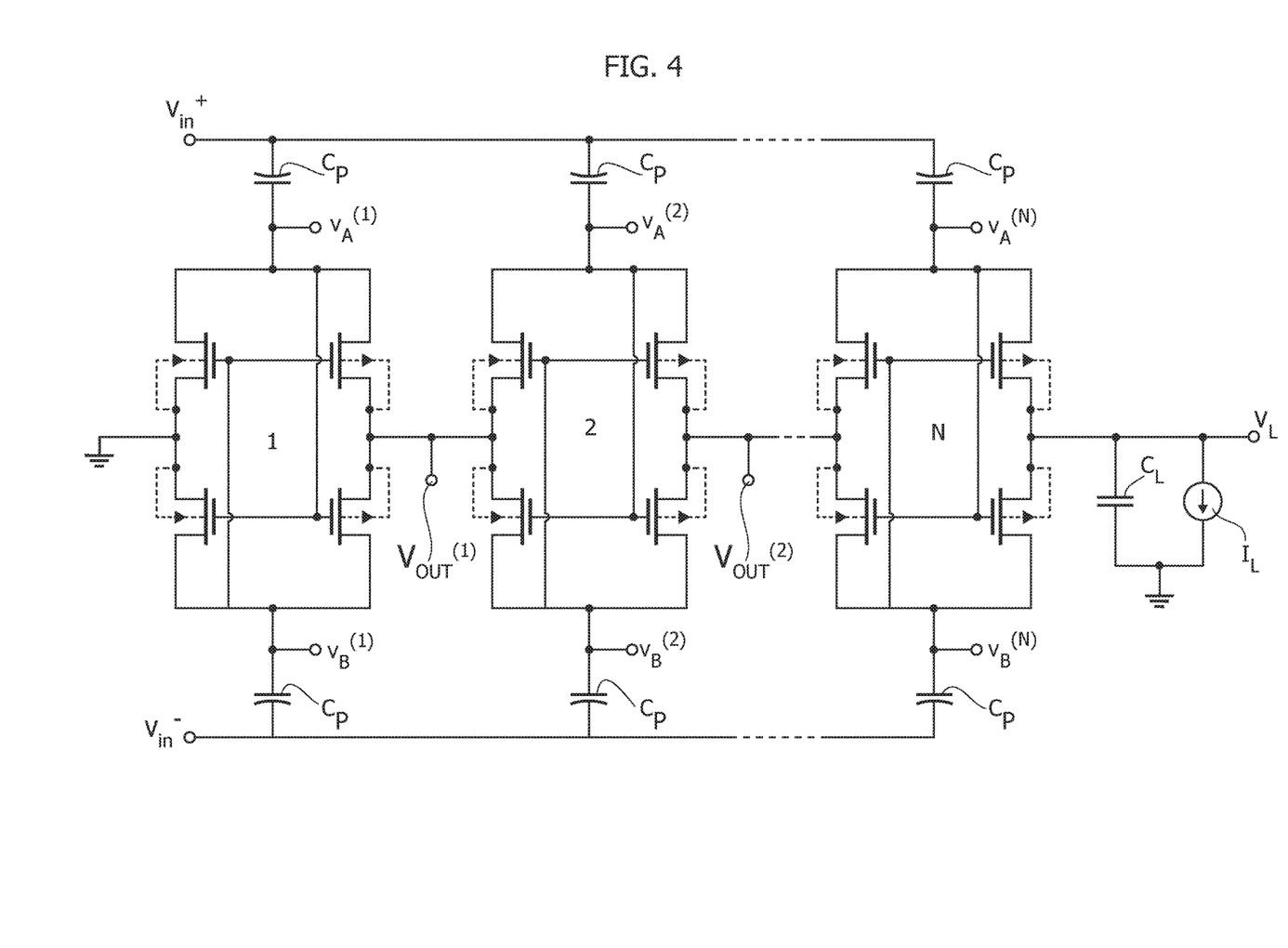
FIG. 4 is a diagram of a multi-stage version of the circuit of FIG. 3.

According to the effective voltage DCout that it is desired to obtain, it is possible to resort to a multi-stage version of the aforesaid circuit, as exemplified in FIG. 4, where each stage 1, 2, . . . , N reproduces the same scheme as the one presented in FIG. 3, and the charge capacitor $C_L$ is set between the last stage or cell and ground (on the right in the figure).

The use of a number of stages in parallel with respect to the input generates at output (i.e., on the charge capacitor $C_L$) a voltage equal to $$V_L = N(V_{in} - V_{on}) \quad (3)$$

where N is the number of stages and $v_{on}$ the generic drop due to the on-resistances of the transistors.

Each stage is capacitively coupled to the input by means of the capacitors $C_P$ present in FIG. 4 so as to conserve the contribution of charge of each stage in order to reach the final voltage $V_L$.

Albeit overcoming the problems deriving from the threshold-voltage loss described for the basic Dickson topology, the solution exemplified in FIGS. 3 and 4 may present a reduction of efficiency represented by the presence of reverse currents that tend to discharge the output capacitance.

With reference to the pMOS transistor $M_{P1}$, the forward-conduction window represents the period of time during which the transistor enables passage of a current from input to output at the positive half-wave of the input signal. In the remaining portion of time, i.e., the reverse-conduction window, the pMOS transistor $M_{P1}$ undergoes a sort of swap between source and drain, triggering a reverse current conduction that discharges the output capacitance.

Ultimately, even though the transistor $M_{P1}$ is on during the positive half-wave of the input signal, conduction in the desired direction occurs to a first approximation only when $$v_{in} > V_{OUT} \tag{4}$$

where $v_{OUT}$ is the voltage DCout of the single stage.

Figure 5:
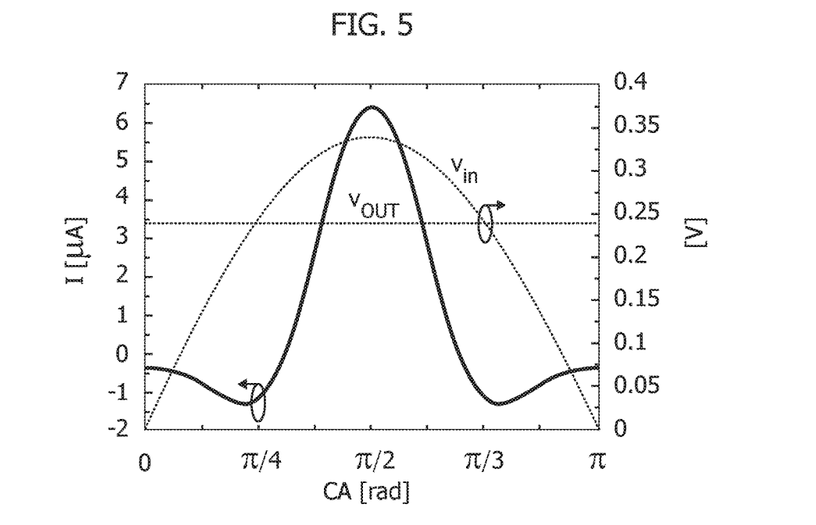
FIG. 5 exemplifies a possible time plot in steady-state conditions of the current on the output node of the circuit of FIG. 3 during the positive half-wave of the input signal, also including the effect of a load current.

The graph represented with a solid line in FIG. 5 exemplifies a possible plot of the current I in steady-state conditions on the output node of the individual stage of FIG. 3 in which also the effect of a current load at output is included, as illustrated in the multi-stage version of FIG. 5, whereas the plot of the input voltage $v_{in}$ and of the output voltage $v_{OUT}$ are represented with dotted lines, where areas of the current I less than zero are the reverse-conduction windows with respect to the angle of conduction (on the abscissa).

It may likewise be noted that, according to the specification on the output voltage and to the number of stages, it cannot be taken for granted that a gate-coupled rectifier as exemplified herein necessarily works with an input voltage higher than $V_{th}$ and that the only operating constraint is represented by Eq. (4).

To overcome the problems of reduction of efficiency due to the reverse currents it is possible to introduce various compensation techniques.

For instance, in the paper by S. S. Chouhan and K. Halonen, "A modified cross coupled rectifier based charge pump for energy harvesting using RF to DC conversion", 2013 EUROPEAN CONFERENCE ON CIRCUIT THEORY AND DESIGN (ECCTD), PP. 1, 4, 8-12 Sep. 2013 (incorporated by reference), it is envisaged that two main pMOS transistors can be diode-connected to prevent reverse conduction by adding two auxiliary pMOS transistors with two capacitors in such a way as to compensate for the threshold-voltage loss just produced on the main pMOS transistors.

In the paper by P. Kamalinejad, K. Keikhosravy, R. Molavi, S. Mirabbasi, and V. C. M. Leung, "Efficiency enhancement techniques and a dual-band approach in RF rectifiers for wireless power harvesting", in 2014 IEEE INTERNATIONAL SYMPOSIUM ON CIRCUITS AND SYSTEMS (ISCAS), PP. 2049-2052, 1-5 Jun. 2014 (incorporated by reference), auxiliary stages are instead introduced in such a way as to supply at input to the main stage appropriate voltage offsets that maximize the efficiency of the system.

These two techniques just described are, however, invasive for the system. In fact, additional losses are introduced, such as to render problematical operation with a low level of input power, albeit introducing improvements on the efficiency of the system for levels of input power such as to render the losses introduced negligible.

An ideally more effective solution is described in P. T. Theilmann, C. D. Presti, D. J. Kelly, and P. M. Asbeck, "A µW Complementary Bridge Rectifier With Near Zero Turn-on Voltage in SOS CMOS for Wireless Power Supplies" in IEEE TRANSACTIONS ON CIRCUITS AND SYSTEMS I: REGULAR PAPERS, VOL. 59, NO. 9, pp. 2111-2124, September 2012 (incorporated by reference) in which a stage referred to as "complementary stage" is added formed by four diode-connected transistors with ideally zero threshold voltage to prevent the losses discussed previously.

Production of the zero-threshold transistors, however, requires adoption of a purposely provided technology that inevitably leads to an increase in the costs of the system.

It is consequently pointed out that it is possible to modify the gate-coupled rectifier exemplified previously in such a way that the modification made proves far from invasive in regard to the system, enabling operation with (very) low levels of incident power.

In one or more embodiments, this modification may be directed to containment of the reverse current, without altering operation of the circuit during the forward-conduction phase, so as to increase the overall efficiency of the rectifier. In fact, by limiting the reverse current that discharges the capacitor $C_L$, a lower forward current is required for maintaining the required level of output voltage. In one or more embodiments, a dynamic variation of the threshold of this sort may enable not only increase of forward conduction and reduction of reverse conduction, but also limitation of reverse conduction, without altering operation in forward conduction.

In practice, in steady-state conditions, by removing less charge from the capacitor $C_L$ during each conduction cycle, the circuit is required to supply less charge during forward conduction in order to maintain the same voltage level on the capacitor $C_L$. This results in a lower input current given the same voltage, and hence a higher efficiency.

Figure 6:
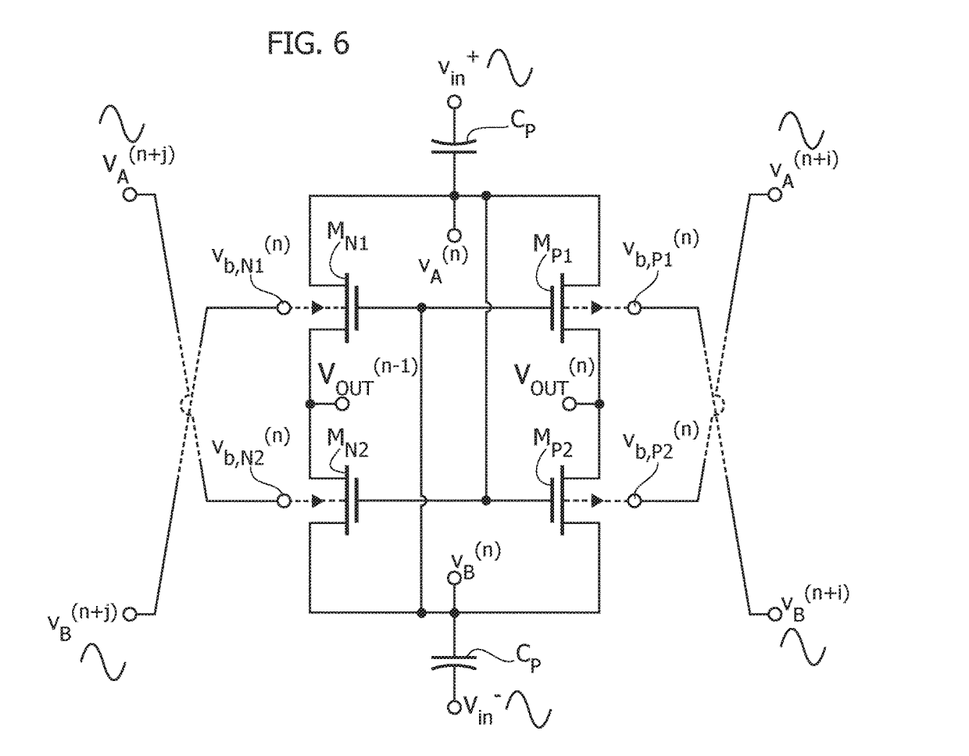
FIG. 6 is a circuit diagram exemplifying embodiments.

A corresponding diagram is exemplified in FIG. 6.

In this case, an a.c. differential signal $V_{in}^+$, $V_{in}^-$ is applied via two capacitors $C_P$ at the opposite terminals of a cell or stage n comprising two branches in parallel, with:
- the first branch including a pair of transistors (for example, pMOS transistors) $M_{P1}$ and $M_{P2}$ arranged with their (source-to-drain or drain-to-source) current paths cascaded;
- the second branch including a pair of transistors (for example, nMOS transistors) $M_{N1}$ and $M_{N2}$, which are also arranged with their current paths cascaded;
- the control terminals (gates) of the transistors $M_{P2}$ and $M_{N2}$ coupled to the terminal of the cell, applied to which, on an "internal" node, is a signal $V_A^{(n)}$, corresponding to the signal $V_{in}^+$ applied via the first capacitor $C_P$;
- the control terminals (gates) of the transistors $M_{N1}$ and $M_{P1}$ coupled to the terminal of the cell, applied to which, on another internal node, is a signal $V_B^{(n)}$, corresponding to the signal $V_{in}^-$ applied via the second capacitor $C_P$.

Starting from the expressions of the threshold voltages of a MOSFET $$v_{th}^{nMOS} = V_{th,0} + \gamma(\sqrt{2\phi_f + v_{SB}} - \sqrt{2\phi_f}) \tag{5}$$

$$v_{th}^{pMOS} = V_{th,0} + \gamma(\sqrt{2\phi_f + v_{BS}} - \sqrt{2\phi_f}) \tag{6}$$

it has been noted that it is possible to act on the bulk voltages of the transistors $M_{N1}$, $M_{N2}$, $M_{P1}$ and $M_{P2}$, i.e., $V_{b,N1}^{(n)}$, $V_{b,N2}^{(n)}$, $V_{b,P1}^{(n)}$, $V_{b,P2}^{(n)}$, respectively, to limit reverse conduction, without having a negative impact upon the forward conduction, via dynamic variation of the threshold voltage.

In this regard, it may be noted that described in the paper by J. Shin, et al.: "A new charge pump without degradation in threshold voltage due to body effect [memory applications]" in IEEE JOURNAL OF SOLID-STATE CIRCUITS, vol. 35, no. 8, pp. 1227-1230, August 2000 (incorporated by reference) is a dynamic variation of the threshold of a Dickson charge pump via auxiliary transistors that connect the bulks of the main transistors alternatively to two different nodes of the system. Also in this case, the additional elements introduce losses in the system such as to render problematical operation of the circuit at low levels of input power.

One or more embodiments enable a dynamic compensation of the threshold to be obtained, without adding invasive elements to the original system.

In one or more embodiments, the signals to be applied to the bulks of the circuit proposed may be in phase or in phase opposition with the input signal according to whether the corresponding transistor is of a p type or of an n type and to whether it has its own forward-conduction window during the positive or negative half-wave of the input signal; in this way, it is possible to enable the threshold voltage to reach a first (minimum) value during the forward-conduction window and a second (maximum) value in the case of reverse conduction.

Furthermore, these signals may have a level of d.c. voltage such as to achieve a good compromise between forward and reverse conduction.

It has likewise been noted, for example with reference to FIG. 4, that—without having to add components to the circuit—the waveforms in the internal nodes of the circuit respect the aforesaid requisites since they have the following evolution:

$$v_A^{(n)} = \left(n - \frac{1}{2}\right)V_{OUT} + \frac{1}{2}\alpha v_{in}(t); n = 1, 2, \ldots, N \quad (7)$$

$$v_B^{(n)} = \left(n - \frac{1}{2}\right)V_{OUT} - \frac{1}{2}\alpha v_{in}(t) \quad (8)$$

where $\alpha$ takes into account the capacitive voltage division between the capacitors $C_P$ and the internal nodes A and B of the circuit.

With reference to the generic cell or stage n of FIG. 6, according to the evaluations on the sign of the bulk signal made previously, the transistors $M_{P1}$ and $M_{N1}$ can be connected to corresponding signals $v_B$, whereas the transistors $M_{P2}$ and $M_{N2}$ will have to be connected to appropriate signals $v_A$ chosen from among all those available within the circuit.

Taking into account Eqs. (7) and (8) and since the signals in question mainly differ for their d.c. component, it is possible to determine this component.

For instance, it is possible to apply to each bulk of each transistor of the n-th cell ideal signals with variable component of appropriate sign equal to $0.5 \cdot \alpha v_{in}$.

To each signal there may then be associated a d.c. component equal, respectively, to $V_{p,OPT}$ and $V_{n,OPT}$, the value of which can be determined so as to increase the overall efficiency of the cell.

By equalling these values with the d.c. components present in Eqs. (7) and (8), there is obtained the index n+i for the stage to which to connect the bulks of the pMOS transistors of the n-th cell and the index n+j to which to connect the bulks of the nMOS transistors.

The values i, j (which may be referred to as "compensation indices") may be given by $$i = \left[\frac{V_{p,OPT}}{V_{OUT}} + \frac{1}{2} - n\right] \quad (9)$$

$$j = \left[\frac{V_{n,OPT}}{V_{OUT}} + \frac{1}{2} - n\right] \quad (10)$$

where the symbol [ ] that indicates the closest integer.

If we assume, as is reasonable to do, that we are working with cascades of identical cells, the values of the compensation indices may be extended to any stage since the following expressions apply:

$$V_{n,OPT}^{(n)} = V_{n,OPT}^{(1)} + (n-1)V_{OUT} \quad (11)$$

$$V_{p,OPT}^{(n)} = V_{p,OPT}^{(1)} + (n-1)V_{OUT} \quad (12)$$

Consequently, the knowledge of i and j enables identification of the way in which to connect the bulks of the transistors of the circuit for the purposes of maximization of the total efficiency of the harvester.

For the n-th cells such that the condition $1 \leq n+i \leq N$ ($1 \leq n+j \leq N$) does not hold, the bulks of the corresponding transistors may be connected, respectively, to ground if $n<1-i$, j or to the output if $n>N-i$, j.

Figure 7:
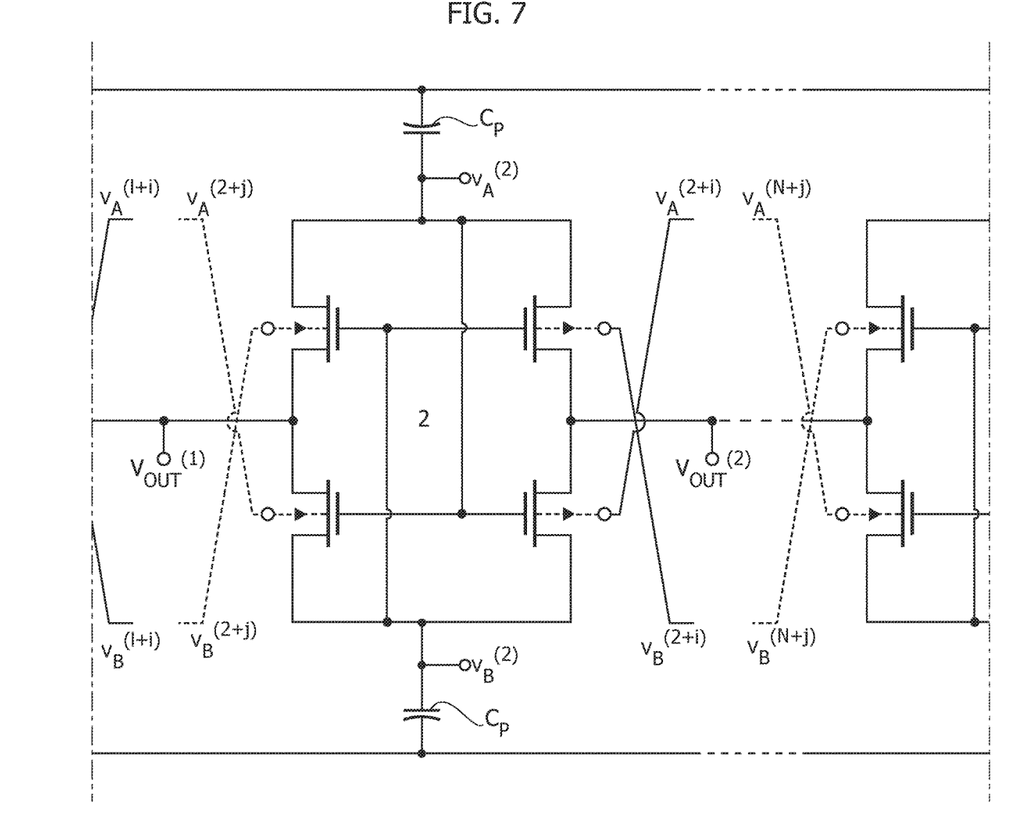
FIG. 7 exemplifies a possible implementation of a harvester comprising possible embodiments.

By virtue of the considerations set forth, FIG. 7 exemplifies a form of harvester comprising N stages and with compensation indices i, j. Even though not explicitly represented in FIG. 7, the connection of the charge capacitor $C_L$ may be the same as that represented in FIG. 4, i.e., between the output $V_{OUT}^{(N)}$ of the last cell or stage and ground.

It has been found that, in the case of circuits designed for providing a maximum of the efficiency with a specification on the output voltage equal to 2.4 V, and with a steady-state current equal to 1 μA ($10^{-6}$ A), by virtue of the specifications and technology used, an embodiment compensated with 10 stages can reach an efficiency of 70%, presenting a sensitivity of approximately −25 dBm.

The degree of the improvement over the original version and the choice of the number of stages as a function of the desired efficiency may be linked to the specifications imposed at output and upon the technology adopted.

In brief, compensation of the reverse currents exemplified herein enables an increase in the efficiency of a harvester deriving from a double-half-wave rectifier, without adding elements such as to introduce, for example, additional losses to the system, enabling the circuit to function with very low levels of input power.

One or more embodiments may consequently regard a rectifier circuit, comprising at least one rectifier cell (see, for example, FIG. 6) with a first cell branch and a second cell branch, which extend in parallel between two opposite nodes (for example, $V_A^{(n)}$, $V_V^{(n)}$), wherein:
  the first branch comprises a first pair of transistors (e.g., $M_{P1}$ and $M_{P2}$) that may be of a first polarity (e.g., pMOS transistors) arranged with their current paths cascaded, with a first intermediate point (e.g., $V_{OUT}^{(n)}$) in-between;
  the second branch comprises a second pair of transistors (e.g., $M_{N1}$ and $M_{N2}$), which may have a second polarity (e.g., nMOS transistors), opposite to the aforesaid first polarity, arranged with their current paths cascaded, with a second intermediate point (e.g., $V_{OUT}^{(n-1)}$) in-between;
  each of the above pairs of transistors comprises a first transistor (e.g., $M_{P2}$, $M_{N2}$) with its control terminal (e.g., the gate) coupled to one ($V_A^{(n)}$) of said opposite nodes and a second transistor (e.g., $M_{N1}$, $M_{P1}$) with its control terminal (e.g., the gate) coupled to the other ($V_B^{(n)}$) of said opposite nodes, so that an a.c. differential input signal (e.g., $V_{in}^+$, $V_{in}^-$) across the aforesaid opposite nodes produces (e.g., according to a double-half-wave scheme of a gate-coupled type), a d.c. output voltage across said first and second intermediate points (e.g., $V_{OUT}^{(n)}$–$V_{OUT}^{(n-1)}$); and the circuit comprises conduction control terminals ($V_{b,N1}^{(n)}$, $V_{b,N2}^{(n)}$, $V_{b,P1}^{(n)}$, $V_{b,P2}^{(n)}$) acting on the bulks of the above transistors for varying the threshold voltage of the transistors themselves, with the aforesaid threshold voltage, for example having an evolution of a sinusoidal type, such as to reach a first value and a second value, respectively, during forward conduction and during reverse conduction of the transistors.

In one or more embodiments, the above first value may be lower than the above second value, thus favouring forward conduction over the reverse conduction.

One or more embodiments may envisage that:
the transistors of the aforesaid first pair ($M_{P1}$ and $M_{P2}$) are of a first polarity (e.g., of a p type);
the transistors of the aforesaid second pair ($M_{N1}$ and $M_{N2}$) are of a second polarity (e.g., of an n type), opposite to the first polarity; and
the aforesaid conduction control terminals ($V_{b,N1}^{(n)}$, $V_{b,N2}^{(n)}$, $V_{b,P1}^{(n)}$, $V_{b,P2}^{(n)}$) are configured for detecting the aforesaid a.c. differential input signal ($V_{in}^+$, $V_{in}^-$) in phase and, respectively, in phase opposition in the aforesaid first pair ($M_{P1}$ and $M_{P2}$) and in the aforesaid second pair ($M_{N1}$ and $M_{N2}$).

In one or more embodiments, the aforesaid conduction control terminals may be configured for detecting the aforesaid a.c. differential input signal in phase and, respectively, in phase opposition according to whether the corresponding transistor has its own forward-conduction window during the positive half-wave or during the negative half-wave of the aforesaid a.c. differential input signal.

One or more embodiments may include input capacitors (e.g., $C_P$) coupled to the aforesaid opposite nodes for receiving the aforesaid a.c. differential input signal.

In one or more embodiments, the transistors of at least one cell of the aforesaid plurality of cells may present conduction control terminals coupled to the opposite nodes of at least one other cell of the aforesaid plurality of cells, the coupling preferentially comprising a d.c. component (see, for example, $V_{p,OPT}$ and $V_{n,OPT}$).

In one or more embodiments, in the aforesaid at least one cell of the aforesaid plurality of cells, the aforesaid first transistor of each pair, and the aforesaid second transistor of each pair may present conduction control terminals coupled, respectively, to the aforesaid one and to the aforesaid other of the opposite nodes of the aforesaid at least one other cell of the plurality of cells.

In one or more embodiments, the aforesaid at least one cell may be the cell of order n in a plurality of N cells, and the aforesaid at least one other cell may comprise at least one between a cell of order n+i and a cell of order n+j in the aforesaid plurality of N cells.

In one or more embodiments, the cells of said plurality of N cells for which the condition 1≤n+i≤N or else the condition 1≤n+j≤N does not hold can have the bulks of the corresponding transistors ($M_{P1}$, $M_{P2}$, $M_{N1}$ and $M_{N2}$) connected, respectively, to ground if n<1–i, j or to output if n>N–i,j.

In one or more embodiments, in the aforesaid plurality of N cells:
in the cell of order n, the transistors of the first pair ($M_{P1}$ and $M_{P2}$) may have a first polarity (e.g., of a p type) and the transistors of the second pair ($M_{N1}$ and $M_{N2}$) may have a second polarity (e.g., of an n type), opposite to the first polarity;
the transistors of the aforesaid first pair ($M_{P1}$ and $M_{P2}$) of the cell of order n may have their bulk coupled to one of the opposite nodes ($V_A^{(n+i)}$, $V_B^{(n+i)}$) of the cell of order n+i; and
the transistors of the aforesaid second pair ($M_{N1}$ and $M_{N2}$) of the cell of order n may have their bulk coupled to one of the opposite nodes ($V_A^{(n+j)}$, $V_B^{(n+j)}$) of the cell of order n+j.

In one or more embodiments, the aforesaid transistors may be MOSFETs.

According to one or more embodiments, a device such as a charge harvester may comprise:
a rectifier circuit according to any one of the preceding claims; and
at least one charge capacitor (e.g., 4, $C_L$) coupled to the output of the rectifier circuit so as to be charged by the aforesaid d.c. output voltage.

One or more embodiments may regard a method for operating a rectifier circuit comprising at least one rectifier cell with a first cell branch and a second cell branch, which extend in parallel between two opposite nodes ($V_A^{(n)}$, $V_B^{(n)}$), wherein:
the first branch includes a first pair of transistors ($M_{P1}$ and $M_{P2}$) arranged with their current paths cascaded, with a first intermediate point ($V_{OUT}^{(n)}$) in-between;
the second branch includes a second pair of transistors ($M_{N1}$ and $M_{N2}$) arranged with their current paths cascaded, with a second intermediate point ($V_{OUT}^{(n)}$) in-between;
each of said pairs of transistors ($M_{P1}$, $M_{P2}$; $M_{N1}$, $M_{N2}$) comprises a first transistor ($M_{P2}$, $M_{N2}$) with its control terminal coupled to one ($V_A^{(n)}$) of the aforesaid opposite nodes and a second transistor ($M_{N1}$, $M_{P1}$) with its control terminal coupled to the other ($V_B^{(n)}$) of the aforesaid opposite nodes.

In one or more embodiments, the above method may include:
applying an a.c. differential input signal across the aforesaid opposite nodes thus producing a d.c. output voltage across the aforesaid first and second intermediate points; and
acting on the bulks of the transistors of the aforesaid transistors for varying the threshold voltage of the transistors themselves by bringing the threshold voltage to a first value and to a second value, respectively, during forward conduction and during reverse conduction of the aforesaid transistors.

Of course, without prejudice to the underlying principles, the details of construction and the embodiments may vary, even significantly, with respect to what has been illustrated herein purely by way of non-limiting example, without thereby departing from the sphere of protection of the invention, which is defined by the annexed claims.

The invention claimed is:
1. A rectifier circuit, comprising:
at least one rectifier cell including a first and a second branch extending in parallel between two opposed nodes, wherein the first branch includes a first pair of transistors arranged with cascaded current paths with a first intermediate point therebetween, wherein the second branch includes a second pair of transistors arranged with cascaded current paths with a second intermediate point therebetween, wherein each of the first and second pairs of transistors includes a first transistor with a control terminal coupled to one node of said two opposed nodes and a second transistor with a control terminal coupled to another node of said two opposed nodes, wherein an a.c. differential input signal applied across said two opposed nodes produces a dc output voltage across said first and second intermediate points, the rectifier circuit further including conduction control terminals connected to bulks of said first and second transistors in each of the first and second branches, said conduction control terminals configured to receive a.c. bulk signals which vary a transistor threshold voltage, with said threshold voltage at a first value during forward conduction of said transistors and at a second value during reverse conduction of said transistors, respectively.

2. The rectifier circuit of claim 1, wherein said first value is less than said second value.

3. The rectifier circuit of claim 1, wherein:
the transistors of said first pair of transistors are of a first polarity;
the transistors of said second pair of transistors are of a second polarity, opposite said first polarity,
said conduction control terminals are configured to detect said differential ac input signal in phase and in phase opposition in said first pair of transistors and in said second pair of transistors, respectively.

4. The rectifier circuit of claim 1, wherein said conduction control terminals are configured to detect said differential ac input signal in phase and in phase opposition as a function of the corresponding transistor having its direct conduction window during the positive or negative half-wave of said differential ac input signal.

5. The rectifier circuit of claim 1, including input capacitors coupled to said two opposed nodes to receive said differential ac input signal.

6. The rectifier circuit of claim 1, including a plurality of said recitifer cells, wherein the transistors of at least one cell of said plurality of rectifier cells have conduction control terminals that receive the a.c. bulk signals from the two opposed nodes of at least one other cell of said plurality of rectifier cells.

7. The rectifier circuit of claim 6, wherein, in said at least one cell of said plurality of cells, said first transistor of each pair and said second transistor of each pair have their conduction control terminals coupled, respectively, to said one node and said another node of the two other opposed node, respectively, of said at least one other cell of said plurality of cells.

8. The rectifier circuit according to claim 6, wherein, said at least one cell being the cell of order n in a plurality of N rectifier cells, said at least one other cell includes at least one of a cell of order n+i and a cell of order n+j in said plurality of cells.

9. The rectifier circuit of claim 8, wherein those cells in said plurality of N rectifier cells for which the relationship $1 \leq n+i \leq N$ or the relationship $1 \leq n+j \leq N$ does not hold have the bulks of the respective transistors referred to ground if $n<1-i, j$ or to output if $n>N-i, j$.

10. The rectifier circuit according to claim 8, wherein, in said plurality of N cells:
in said cell of order n, the transistors of said first pair are of a first polarity and the transistors of said second pair are of a second polarity, opposed to said first polarity,
the transistors of said first pair in said cell of order n have their conduction control terminals connected to receive the a.c. bulk signals from the two opposed nodes of said cell of order n+i, and
the transistors of said second pair in said cell of order n have conduction control terminals connected to receive the a.c. bulk signals from the two opposed nodes of said cell of order n+j.

11. The rectifier circuit of claim 8, wherein said transistors include MOSFET transistors.

12. A device, including:
a rectifier circuit, and
at least one charge capacitor coupled to the output of said rectifier circuit for charging by a dc output voltage;
wherein the rectifier circuit comprises:
at least one rectifier cell including a first and a second branch extending in parallel between two opposed nodes,
wherein the first branch includes a first pair of transistors arranged with cascaded current paths with a first intermediate point therebetween,
wherein the second branch includes a second pair of transistors arranged with cascaded current paths with a second intermediate point therebetween,
wherein each of the first and second pairs of transistors includes a first transistor with a control terminal coupled to one node of said two opposed nodes and a second transistor with a control terminal coupled to another node of said two opposed nodes,
wherein an a.c. differential input signal applied across said two opposed nodes produces a dc output voltage across said first and second intermediate points,
the rectifier circuit further including conduction control terminals connected to bulks of said first and second transistors in each of the first and second branches, said conduction control terminals configured to receive a.c. bulk signals which vary a transistor threshold voltage, with said threshold voltage at a first value during forward conduction of said transistors and at a second value during reverse conduction of said transistors, respectively.

13. A method of operating a rectifier circuit, including at least one rectifier cell with a first and a second branch extending in parallel between two opposed nodes, wherein:
the first branch includes a first pair of transistors of a first polarity arranged with cascaded current paths with a first intermediate point therebetween,
the second branch includes a second pair of transistors of a second polarity arranged with cascaded current paths with a second intermediate point therebetween,
each of said first and second pairs of transistors includes a first transistor with a control terminal coupled to one node of said two opposed nodes and a second transistor with a control terminal coupled to another node of said two opposed nodes,
the method including:
applying an a.c. differential input signal across said two opposed nodes to produce a dc output voltage across said first and second intermediate points,
applying a.c. bulk signals to the bulks of said first pair of transistors and said second pair of transistors to vary the transistor threshold voltage by bringing said threshold voltage to a first value and to a second value during forward conduction and during reverse conduction, respectively, of said first pair of transistors and said second pair of transistors.

14. A rectifier circuit, comprising:

a plurality of rectifier stages, wherein each rectifier stage comprises:
  a first node;
  a second node;
  a first pair of transistors of a first conductivity type having source-drain paths coupled in series between the first and second nodes, the first pair including a first transistor having a gate coupled to the second node and a second transistor having a gate coupled to the first node; and
  a second pair of transistors of a second conductivity type having source-drain paths coupled in series between the first and second nodes, the second pair including a third transistor having a gate coupled to the second node and a fourth transistor having a gate coupled to the first node;

wherein bulk terminals of the first and third transistors in one rectifier stage are coupled to receive a.c. bulk control signals generated at the second nodes of two other rectifier stages of said plurality of rectifier stages and wherein bulk terminals of the second and fourth transistors are coupled to receive a.c. bulk control signals generated at the first nodes of said two other rectifier stages of said plurality of rectifier stages.

15. The rectifier circuit of claim 14, further comprising:
a first input node;
a second input node;
wherein the first and second input nodes are configured to receive an a.c. input signal;
a first capacitor coupled between the first input node and the first node; and
a second capacitor coupled between the second input node and the second node.

16. The rectifier circuit of claim 14, further comprising:
a first output node coupled to a node of the series coupling of the first pair of transistors; and
a second output node coupled to a node of the series coupling of the second pair of transistors;
wherein a d.c. output signal is generated at said first and second output nodes.

* * * * *

UNITED STATES PATENT AND TRADEMARK OFFICE
CERTIFICATE OF CORRECTION

PATENT NO. : 10,312,821 B2
APPLICATION NO. : 15/359213
DATED : June 4, 2019
INVENTOR(S) : Leandro Grasso et al.

Page 1 of 1

It is certified that error appears in the above-identified patent and that said Letters Patent is hereby corrected as shown below:

In the Specification

At Column 4, Line 60, please replace Equation (3) [[ $V_L = N(V_{in} - V_{cn})$ ]] with -- $V_L = N(V_{in} - V_{on})$ --

At Column 8, Line 54, please replace the term [[ $V_V^{(n)}$ ]] with -- $V_B^{(n)}$ --

Signed and Sealed this
Twenty-fifth Day of February, 2020

Andrei Iancu
*Director of the United States Patent and Trademark Office*